(12) United States Patent
Favaretto

(10) Patent No.: US 9,085,223 B2
(45) Date of Patent: Jul. 21, 2015

(54) VEHICLE WITH ELECTRIC PROPULSION

(71) Applicant: Ferrari S.p.A., Modena (IT)

(72) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/760,649

(22) Filed: Feb. 6, 2013

(65) Prior Publication Data

US 2013/0220716 A1  Aug. 29, 2013

(30) Foreign Application Priority Data

Feb. 7, 2012  (IT) .............................. BO2012A0056

(51) Int. Cl.
*B60R 16/04* (2006.01)
*B60K 1/04* (2006.01)
*B60L 3/00* (2006.01)
*B60L 11/18* (2006.01)
*H01M 2/10* (2006.01)
*H01M 10/613* (2014.01)
*H01M 10/625* (2014.01)
(Continued)

(52) U.S. Cl.
CPC ................ *B60K 1/04* (2013.01); *B60L 3/0007* (2013.01); *B60L 11/1855* (2013.01); *B60L 11/1877* (2013.01); *H01M 2/1077* (2013.01); *H01M 2/1083* (2013.01); *H01M 2/1094* (2013.01); *H01M 10/504* (2013.01); *H01M 10/5004* (2013.01); *H01M 10/5016* (2013.01); *H01M 2/1211* (2013.01); *H01M 10/0525* (2013.01); *H01M 10/503* (2013.01); *H01M 10/5053* (2013.01); *Y02T 10/7011* (2013.01); *Y10S 903/903* (2013.01)

(58) Field of Classification Search
USPC ........................................................ 180/68.5
See application file for complete search history.

(56) References Cited

U.S. PATENT DOCUMENTS

2002/0160254 A1* 10/2002 Stocchiero ...................... 429/54
2006/0214633 A1*  9/2006 Cho ............................. 320/112
(Continued)

FOREIGN PATENT DOCUMENTS

DE  102007010742 A1  8/2008
DE  102007010748 A1  8/2008
(Continued)

OTHER PUBLICATIONS

Italian Application Serial No. IT BO20120056, Search Report dated Oct. 31, 2012, 3 pgs.
(Continued)

*Primary Examiner* — Jeffrey J Restifo
*Assistant Examiner* — Erez Gurari
(74) *Attorney, Agent, or Firm* — Schwegman Lundberg & Woessner, P.A.

(57) ABSTRACT

A vehicle with electric propulsion, which presents a longitudinal direction, which is parallel to the direction of the rectilinear motion, and a transverse direction, which is perpendicular to the longitudinal direction; a storage system is provided with a pack of chemical batteries, which are connected to each other in series and in parallel and comprise respective electrochemical cells; each chemical battery has a cylindrical shape having a central symmetry axis; and the storage system is fitted inside the vehicle in such a way that the central symmetry axis of each chemical battery is not parallel either to the longitudinal direction of the vehicle or to the transverse direction of the vehicle.

11 Claims, 8 Drawing Sheets

(51) Int. Cl.
*H01M 10/653* (2014.01)
*H01M 2/12* (2006.01)
*H01M 10/0525* (2010.01)
*H01M 10/643* (2014.01)
*H01M 10/6554* (2014.01)

(56) References Cited

U.S. PATENT DOCUMENTS

2012/0003508 A1   1/2012  Narbonne
2012/0301765 A1*  11/2012 Loo et al. .................... 429/100

FOREIGN PATENT DOCUMENTS

| DE | 102008052284 A1 | 4/2010 |
| DE | 102008043784 A1 | 5/2010 |
| EP | 1662602 A1 | 5/2006 |
| EP | 2369656 A1 | 9/2011 |
| FR | 2961153 A1 | 12/2011 |

OTHER PUBLICATIONS

European Application Serial No. 13154487.6, European Search Report mailed Jun. 6, 2013, 5 pgs.

* cited by examiner

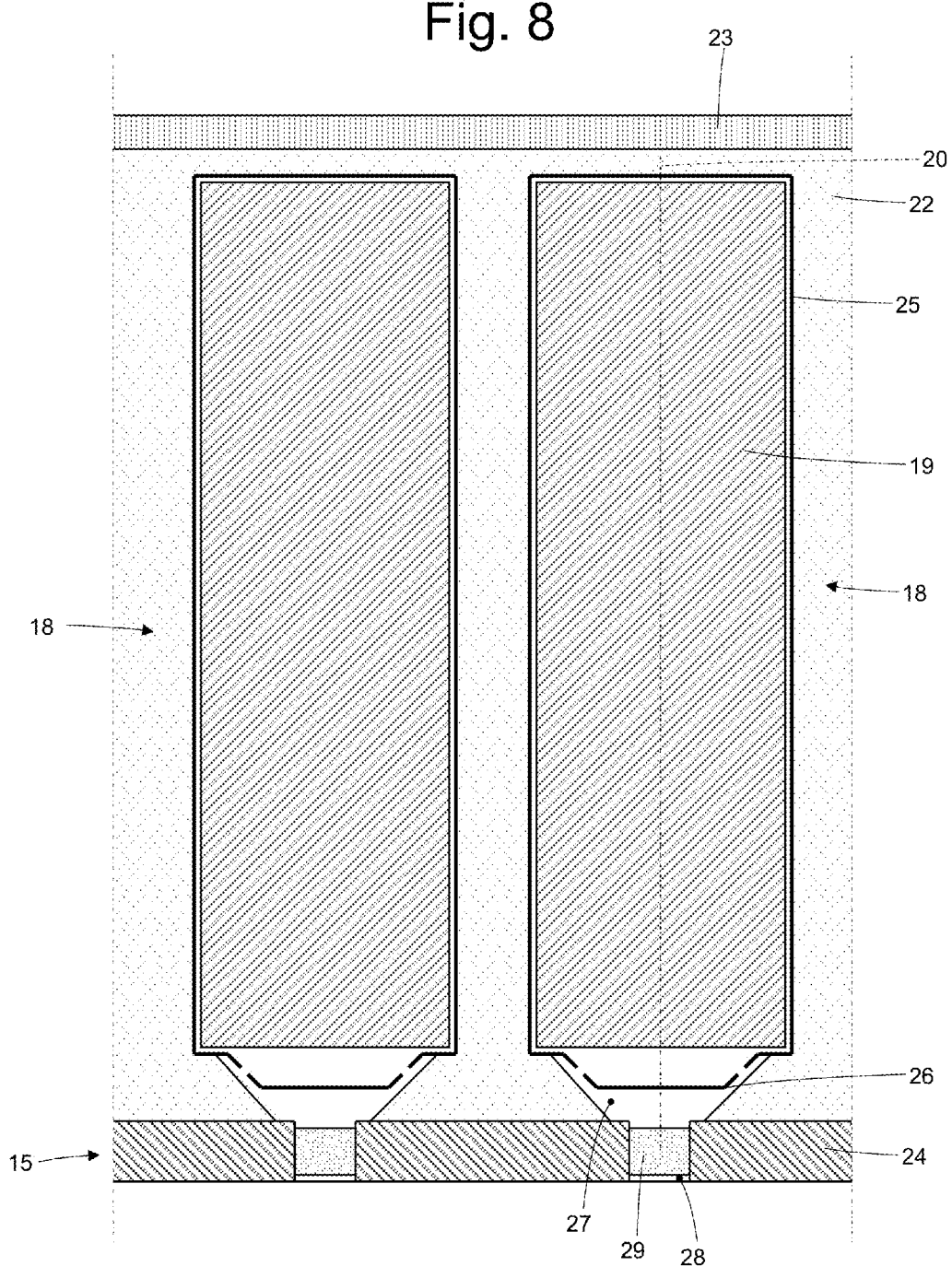

VEHICLE WITH ELECTRIC PROPULSION

PRIORITY CLAIM AND RELATED APPLICATIONS

This application claims the benefit of priority under 35 U.S.C. Section 119 to Italian Patent Application Ser. No. B02012A 000056, filed Feb. 7, 2012, which application is incorporated herein by reference in its entirety.

FIELD OF THE INVENTION

The present invention relates to a vehicle with electric propulsion.

The present invention is advantageously applied in a road vehicle with hybrid propulsion to which the following description will explicitly refer without loss of generality.

PRIOR ART

A hybrid vehicle comprises an internal combustion heat engine, which transmits the driving torque to the driving wheels through a transmission provided with a gearbox, and at least one electric machine which is mechanically connected to the driving wheels and is electrically connected to a system for the storage of electric energy. Normally, the system for the storage of electric energy comprises a pack of chemical batteries which are connected to each other in series and in parallel.

The placement of the storage system into the vehicle may be very complex, particularly in the case of a high performance sports vehicle which has very small inside spaces. In particular, the storage system must be possibly arranged close to the electric machine to reduce the length of the electric connection cables (i.e. to reduce the weight of the electric cables and the power losses by Joule effect in the electric cables themselves), must be possibly arranged in a position protected from crashes, must be arranged in a position protected from heat sources and that can be easily cooled down as it cannot withstand high temperatures, and must be arranged so as not to unbalance the vehicle balance with its relevant mass in other words, it must be arranged centrally close to the barycenter and must be arranged close to the ground to obtain a good dynamic behavior of the vehicle).

It has been proposed to arrange the batteries of the storage system at the floor that makes up a bottom wall of the compartment (i.e. lie the storage system on the floor or insert the storage system into the box-shaped floor). The arrangement of the storage system at the floor offers several advantages, since in this way the storage system is highly protected against crashes being arranged into the safety cell of the compartment, is relatively close to the electric machine, is arranged in a position not subject to overheating and is easy to be cooled down, and is arranged very close to the ground in central position.

However, the useful height for the storage system at the floor is reduced (approximately in the order of few centimeters), particularly in the case of a high performance sports vehicle having a very small overall height from the ground. Accordingly, in order to arrange the storage system at the floor, the chemical batteries of the storage system must have a very small overall thickness; thus, the traditional chemical batteries for motor traction which have a shape similar to the cubic shape (i.e. they have a relevant thickness which is equal to if not higher than, the width/length) are not suitable to be arranged at the floor.

Patent application DE102007010742A1 and patent application DE102007010748A1 describe a system for the storage of electric energy for a vehicle comprising a pack of chemical batteries, which are connected to each other in series and in parallel, and comprise respective electrochemical cells; each chemical battery has a cylindrical shape having a central (longitudinal) symmetry axis. The chemical batteries are arranged into a parallelepiped container, are vertically oriented and lie on a lower cooling plate which serves as a support base; a plurality of heat conductive bar perpendicularly raise from the cooling plate which bars are arranged between the chemical batteries. The free spaces between the chemical batteries 2 are filled with a plastic substance (in particular, an epoxy resin, polyurethane or silicone) which leaves only the upper part of the chemical batteries exposed at the electric terminals.

Patent application US2012003508A1 describes a system for the storage of electric energy for a vehicle comprising a pack chemical batteries, which are connected to each other in series and in parallel and comprise respective electrochemical cells. Each chemical battery has a cylindrical shape having a central (longitudinal) symmetry axis. The chemical batteries are arranged into a parallelepiped container, are vertically oriented and lie on a lower cooling plate which serves as a support base. The free spaces between the chemical batteries are filled with a plastic substance (in particular, an electrically insulating foam) which leaves an upper part of the chemical batteries exposed at the electric terminals.

DESCRIPTION OF THE INVENTION

The object of the present invention is to provide a vehicle with electric propulsion which is free from the above-described drawbacks and at the same time is easy and cost-effective to be implemented.

According to the present invention, a vehicle with electric propulsion is provided according to the appended claims.

BRIEF DESCRIPTION OF THE DRAWINGS

The present invention will now be described with reference to the accompanying drawings, which show some non-limiting embodiment examples thereof, in which:

FIG. 8 shows a diagrammatic sectional view of the system for the storage of electric energy of FIG. 2 according to a further construction variant.

PREFERRED EMBODIMENTS OF THE INVENTION

Figure 1:
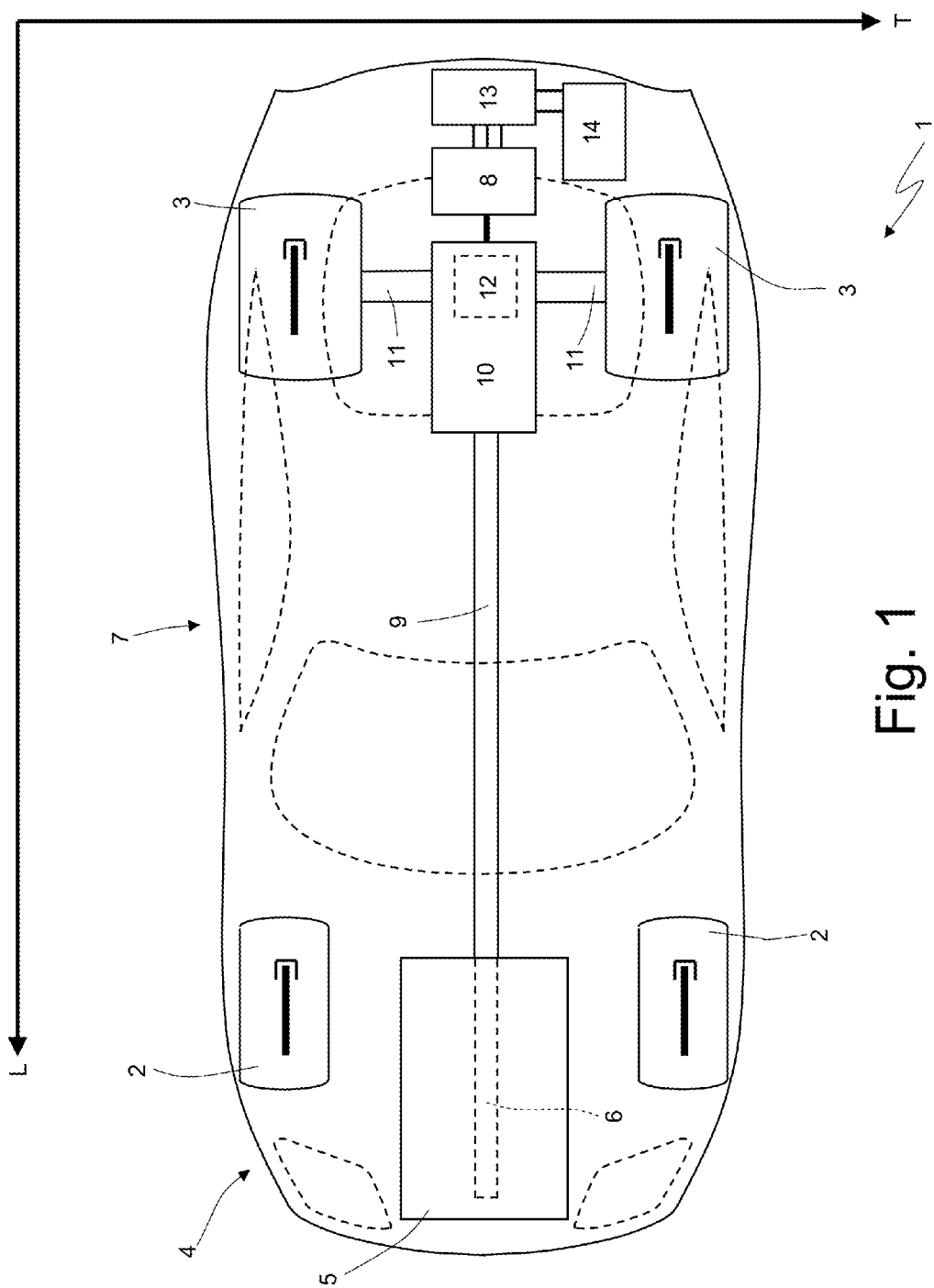
FIG. 1 shows a diagrammatic plan view of a road vehicle with hybrid propulsion.

In FIG. 1, reference numeral 1 indicates as a whole a road vehicle with hybrid propulsion provided with two front wheels 2 and two rear driving wheels 3 which receive the driving torque from a hybrid motor propulsion system 4.

Vehicle 1 presents a longitudinal direction L parallel to the direction of the rectilinear motion (i.e. to the direction of motion with null steering angle) and a transverse direction T perpendicular to the longitudinal direction L.

The hybrid motor propulsion system 4 comprises an internal combustion heat engine 5 which is arranged in front position and is provided with a driving shaft 6, an automatic transmission 7, which transmits the driving torque generated by the internal combustion engine 5 to the rear driving wheels 3, and an electric machine 8 which is mechanically connected to transmission 7 and is reversible (i.e. it can work both as an electric motor, absorbing electric energy and generating a mechanical driving torque, and as electric generator, absorbing mechanical energy and generating electric energy).

Transmission 7 comprises a drive shaft 9 which on one side is angularly integral to driving shaft 6 and on the other side is mechanically connected to a dual clutch gearbox 10, which is arranged in rear position and transmits the motion to the rear driving wheels 3 by means of two axle shafts 11 which receive the motion from a differential gear 12. The main electric machine 8 is mechanically connected to gearbox 10 and in particular, it is angularly integral to a primary shaft of gearbox 10; as regards the methods of connecting the main electric machine 8 to the dual clutch gearbox 10, reference will be made, for example, to the description of patent application EP2325034A1.

Figure 2:
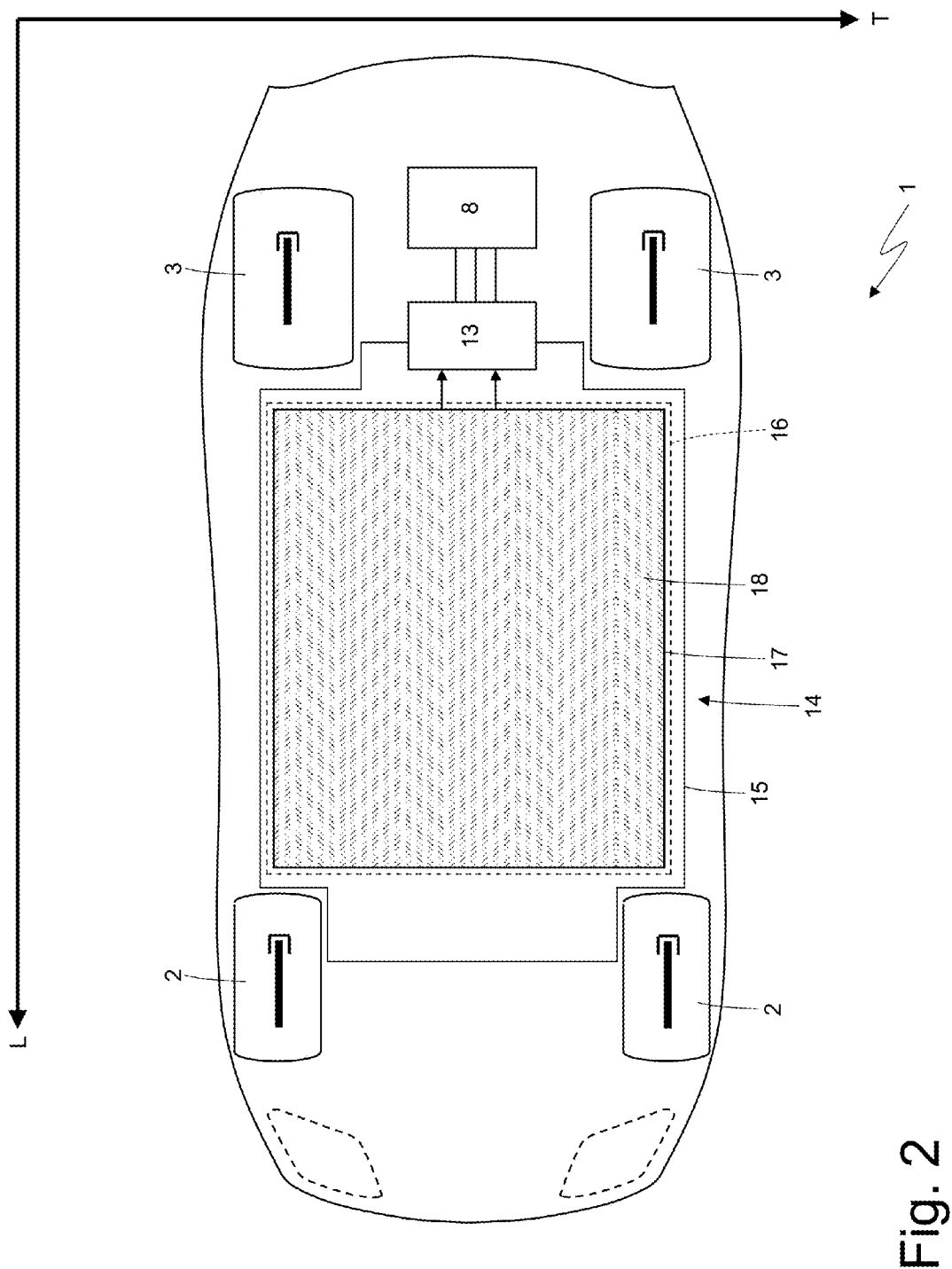
FIG. 2 shows a diagrammatic plan view of the road vehicle of FIG. 1 with highlighted a system for the storage of electric energy implemented according to the present invention.

As shown in FIG. 2, road vehicle 1 is provided with a frame comprising a floor 15 (partially and schematically shown in FIG. 2) which makes up a bottom wall of the compartment; a housing 16 is obtained in floor 15 which houses the storage system 14 and thus, the storage system 14 lies on floor 15. When the frame is made of metal, the floor is welded or screwed to the frame while when the frame is made of a composite material, the floor is monolithic (i.e. entirely integrated) with the frame.

Storage system 14 may comprise a container 17 (typically made of plastic material which is thermally conductive and electrically insulating) having a parallelepiped shape, which is inserted into housing 16 (i.e. lies directly onto floor 15). Moreover, the storage system 14 comprises a pack of chemical batteries 18, which are housed into container 17, are connected to each other in series and in parallel and comprise respective electrochemical cells 19 (schematically shown in FIGS. 4, 5 and 8) which are adapted to convert the chemical energy stored into electric energy and vice versa. According to a preferred embodiment, the electrochemical cells 19 are lithium-ion ("Li-Ion") ones.

Figure 3:
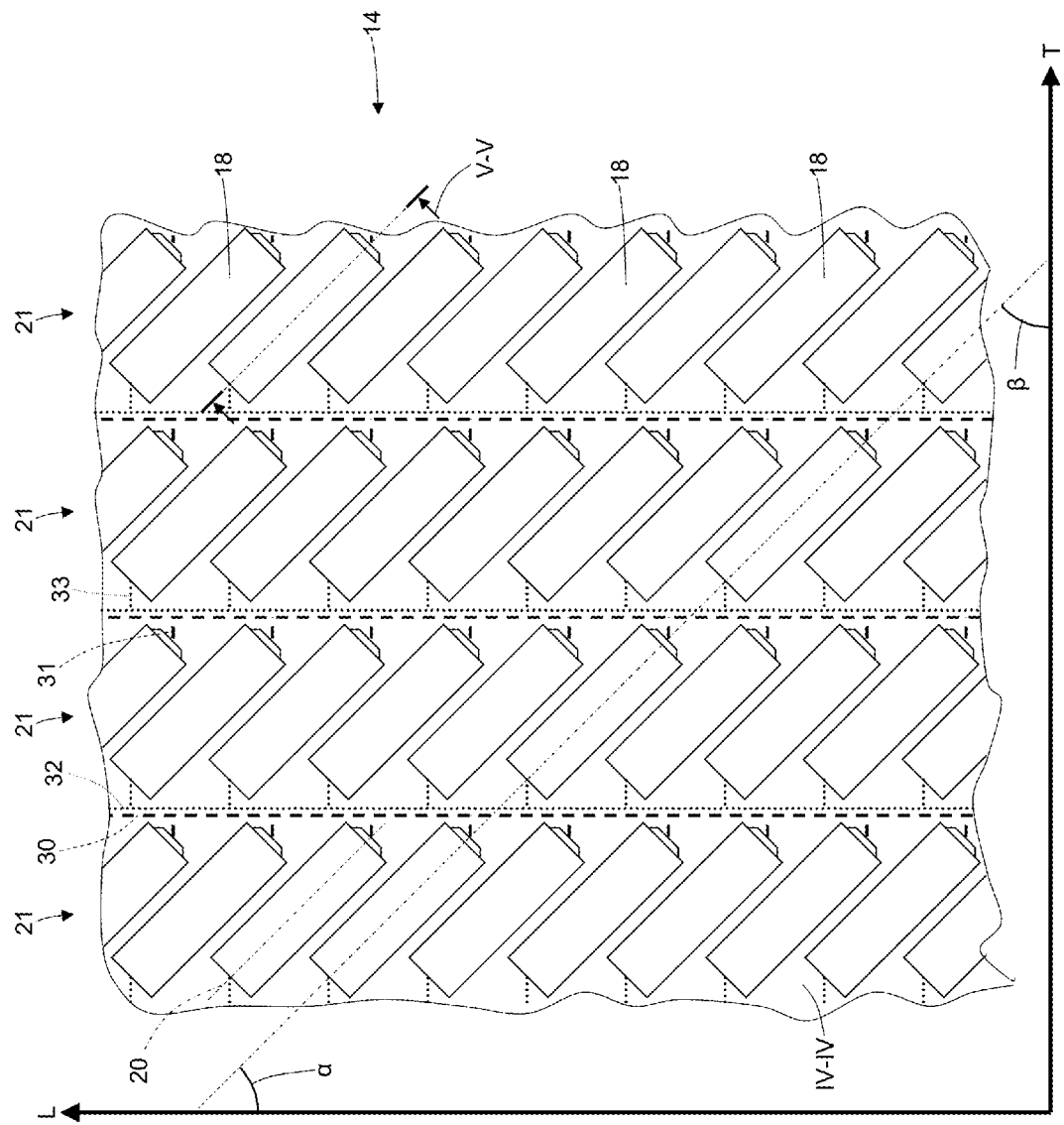
FIG. 3 shows a diagrammatic plan, enlarged scale view of a part of the system for the storage of electric energy of FIG. 2.
Figure 4:
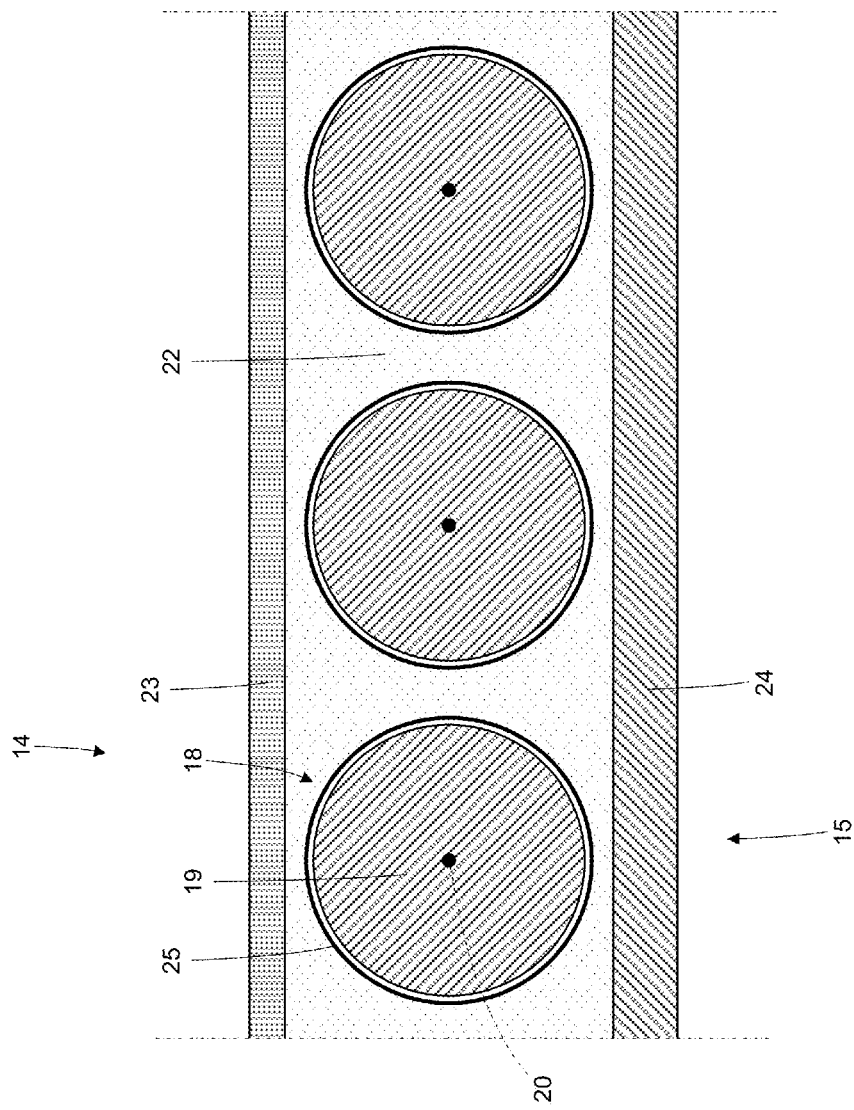
FIG. 4 shows a diagrammatic sectional view along line IV-IV of a detail of the system for the storage of electric energy of FIG. 2.
Figure 5:
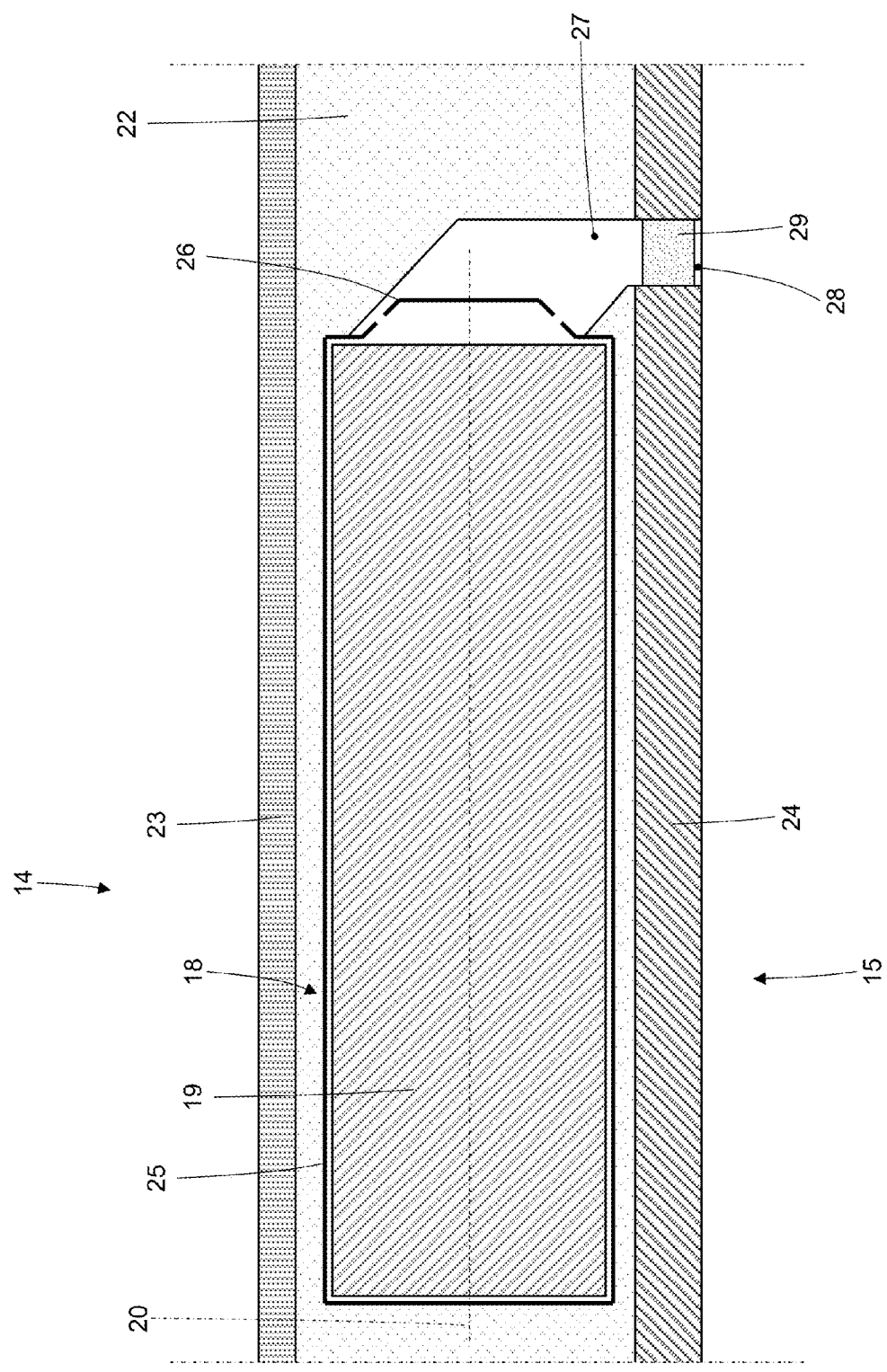
FIG. 5 shows a diagrammatic sectional view along line V-V of a detail, of the system for the storage of electric energy of FIG. 2.

As shown in FIGS. 3, 4 and 5, each chemical battery 18 has a cylindrical shape having a central symmetry axis 20.

The storage system 14 is shaped so as no be fitted inside vehicle 1 in such a way that the central symmetry axis 20 of each chemical battery 18 is not parallel either to the longitudinal direction L of vehicle 1 or to the transverse direction T of vehicle 1.

In the embodiment, shown in FIGS. 3, 4 and 5, the chemical batteries 18 are horizontally arranged (i.e. with the central symmetry axes 20 horizontal, and parallel no floor 15) and the central symmetry axis 20 of each battery forms an acute angle α with the longitudinal direction L of vehicle 1 and forms an acute angle β with the transverse direction T of vehicle 1. In the embodiment shown in FIGS. 3, 4 and 5, angles α and β are identical to each other and are equal to 45°; it is clear that according to alternative embodiments not shown, angles α and β may be different from each other (for example, angle α may be equal to 30° and angle β may be equal to 60° or vice versa).

In the embodiment shown in FIGS. 3, 4 and 5, the chemical batteries 18 are all parallel to each other and thus they all have the same orientation with respect to the longitudinal direction L and to the transverse direction T of vehicle 1 (i.e. all the central symmetry axes 20 of the chemical batteries 18 form a same acute angle α with the longitudinal direction L of vehicle 1 and they all form the same acute angle β with the transverse direction T of vehicle 1).

Figure 6:
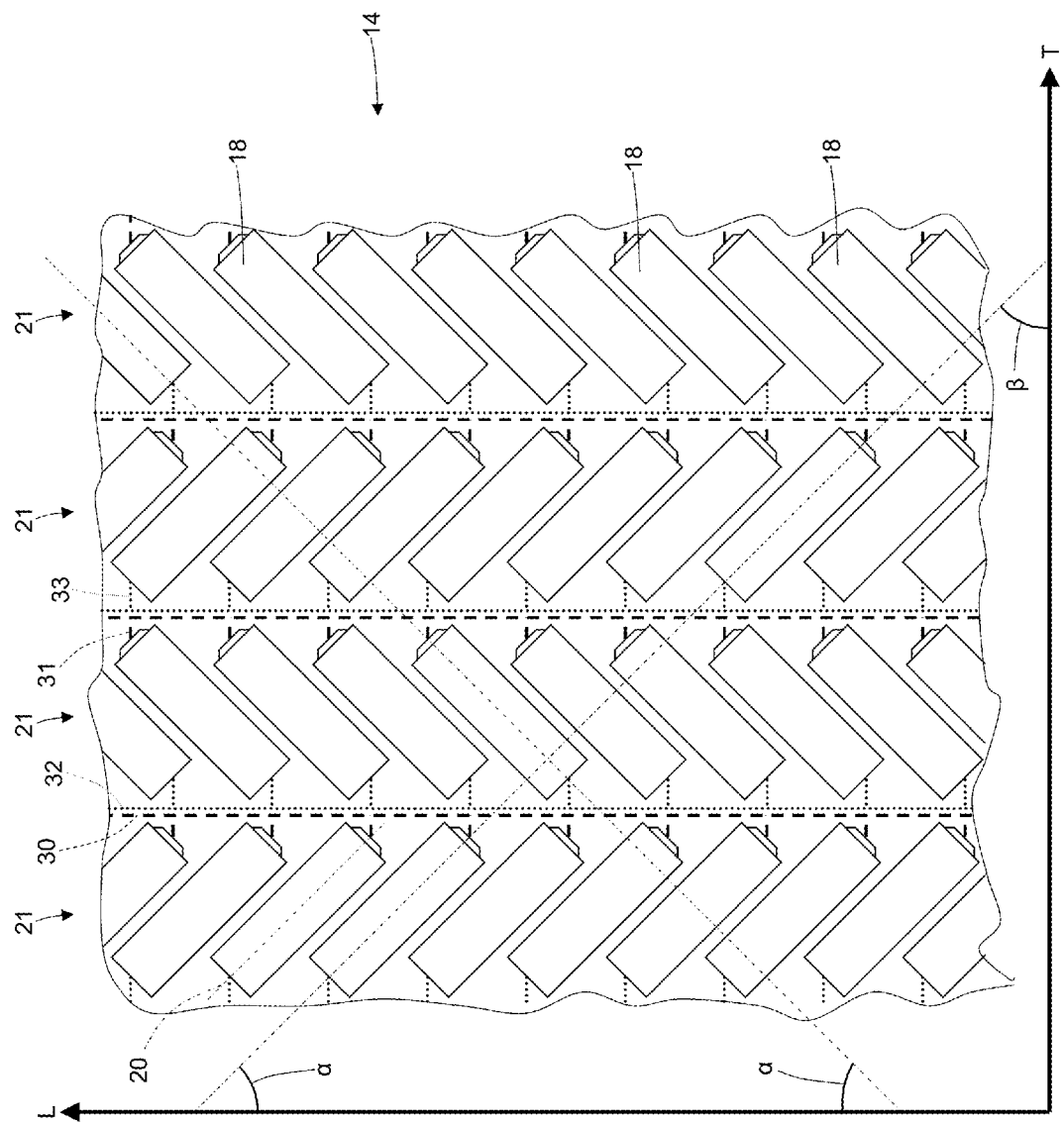
FIG. 6 and 7 show two diagrammatic plan, enlarged scale views of a part of the system for the storage of electric energy of FIG. 2 according to two construction variants.
Figure 7:
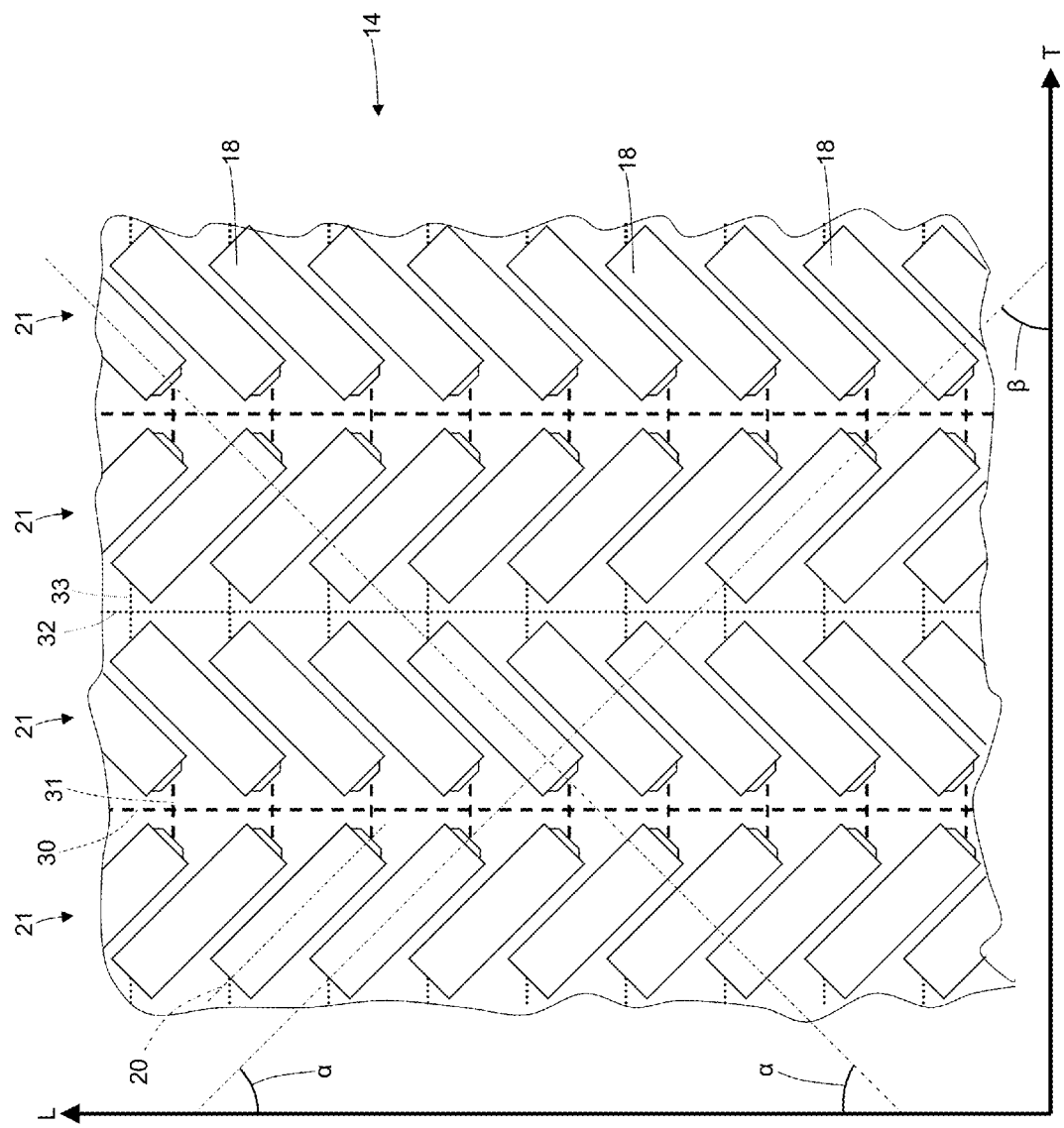

In the embodiment shown in FIGS. 6 and 7, the chemical batteries 18 have two different orientations with respect to the longitudinal direction L and to the transverse direction T of vehicle 1. In particular, the chemical batteries 18 of each row 21 are arranged perpendicular to the chemical batteries 18 of the adjacent rows 21; i.e. the central symmetry axes 20 of the chemical batteries 18 of each row 21 are arranged perpendicular to the central symmetry axes 20 of the chemical batteries 18 of the adjacent rows 21.

In the embodiment shown in FIG. 8, the chemical batteries 18 are vertically arranged (i.e. with the central symmetry axes 20 vertical and perpendicular to floor 15) and the central symmetry axis 20 of each chemical battery 18 is perpendicular to both the longitudinal direction L of vehicle 1 and to the transverse direction T of vehicle 1.

Preferably, the chemical batteries 18 are arranged in rows 21 parallel to each other. In the embodiment shown, the pack of chemical batteries 18 has a single layer of chemical batteries 18 (i.e. no chemical battery 18 has another chemical battery 18 arranged on top or beneath it); in other words, all the chemical batteries 18 (substantially) have the same vertical height. According to a different embodiment not shown, the pack of chemical batteries 18 has two or more layers of chemical batteries 18 arranged on top of each other.

As shown in FIGS. 4, 5 and 8, the storage system 14 comprises a support matrix 22 made of plastic material, inside which the chemical batteries 18 are embedded so that the chemical batteries 18 are completely covered by the support matrix 22. According to a preferred embodiment, the support matrix 22 is manufactured by co-molding the plastic material with the chemical batteries 18, i.e. the chemical batteries 18 (already provided with all the electric and, possibly, safety connections) are arranged in a mould inside which the plastic material is then fed (typically by injection).

According to a preferred embodiment, container 17 and the support matrix 22 present an adjusted mechanical strength so as collapse (break up) by getting deformed in case of crash. In other words, container 17 and the support matrix 22 are sized to have a sufficiently high mechanical strength (with an adequate safety margin) to withstand the stresses of the standard drive (either resulting from accelerations or from vibrations), but not sufficiently high to withstand the stresses that occur in case of crash (obviously of a certain seriousness, not for example a simple rear-ending at low speed). In any case, it is essential for the mechanical strength of container 17 and of the support matrix 22 to be (significantly) smaller than the mechanical strength of the single chemical batteries 18, since in case of serious crash it is admissible (or, in some situations, even desirable) if container 17 and the support matrix 22 break up, but leaving the single chemical batteries 18 entire. In the practice, container 17 and the support matrix 22 have an adjusted mechanical strength which is lower than the mechanical strength of the single chemical batteries 18 so that in case of crash, container 17 and the support matrix 22 collapse by getting deformed while the single chemical batteries 18 remain entire and are displaced with respect to container 17 and to the support matrix 22.

In case of crash which deforms the frame of vehicle 1 (and thus, floor 15), the storage system 14 which lies on floor 15 is also deformed and thus tends to get compressed; in this situation, thanks to the fact that container 17 and the support matrix 22 have a "moderate" mechanical strength, container 17 and the support matrix 22 break up (collapse) by getting deformed, thus allowing the deformation of the storage system 14 as a whole; two advantageous effects are obtained in this way: on the one hand, the storage system 14 does not make up a local stiffening of the frame of vehicle 1 which prevents or in any case hinders the controlled deformation of the frame itself (the controlled deformation of the frame is essential to absorb the crash energy without subjecting the vehicle passengers to hazardous decelerations), and on the other hand the single chemical batteries 18 are not subjected to destructive mechanical stresses (i.e. they remain substantially entire) since only container 17 and the support matrix 22 which get deformed cause a displacement (but not a breakage) of the single chemical batteries 18.

To this end, we should note the importance of the fact that the central symmetry axis 20 of each chemical battery 18 is not parallel either to the longitudinal direction L of vehicle 1 or to the transverse direction T of vehicle 1. In this way, in case of front or lateral crash of vehicle 1, the chemical batteries 18 do not tend to "jib" against the crash (i.e. they are not loaded at the tip and thus they do not tend form "beams" arranged parallel to the direction of the crash and which act as very rigid "struts"), on the contrary, the chemical batteries 18 tend to disperse without opposing any significant resistance to the crash (i.e. without creating any lines of resistance to the crash). The cylindrical shape of the chemical batteries 18 tends to promote the reciprocal sliding of she chemical batteries 18 on each other (i.e. a chemical battery 18 during its lateral displacement tends to roll on the adjacent chemical battery 18 rather than jamming against the adjacent chemical battery 18), further reducing the risk of jibbing. In this way, the two advantageous effects mentioned above are obtained: on the one hand, the storage system 14 does not make up a local stiffening of the frame of vehicle 1 which prevents or in any case hinders the controlled deformation of the frame itself, and on the other hand the single chemical batteries 18 are not subjected to destructive mechanical stresses (i.e. they remain substantially entire).

Preferably, the support matrix 22 is made of a plastic material which is thermally conductive and electrically insulating; in this way, the support matrix 22 allows the heat that is produced into the chemical batteries 18 to be transmitted to the outside and at the same time ensures an optimal electric insulation to the pack of chemical batteries 18. According to a preferred embodiment shown in FIGS. 4, 5 and 8, a cooling plate 23 may be provided, which lies on a surface of the support matrix 22 and is thermally connected to a cooling system for evacuating the heat produced by chemical batteries 18; for example, the cooling plate 23 may be made of a metal material having a high thermal conductivity and may be thermally coupled to an air/air radiator installed on board of the vehicle (possibly provided with one or more additional fans for a forced cooling). The cooling plate 23 may also be provided with channeling containing a cooling fluid for increasing its heat transmission capacity.

According to the preferred embodiment shown in FIGS. 4, 5 and 8, the cooling plate 23 lies (in particular, packed to increase the contact surface and thereby the heat exchange) on an upper surface of the support matrix 22; a lower surface of the support matrix 22, on the other hand, lies (in particular, packed to increase the contact surface and thereby the heat exchange) on floor 15 (and preferably on a bottom panel 24 of floor 15). The outside environment is beneath the bottom panel 24 of to 15 which makes up the support surface for the storage system 14 and when the road vehicle 1 is moving, the bottom panel 24 of floor 15 is constantly lapped by the aerodynamic air, allowing a high cooling power to be obtained.

According to a possible embodiment, when the frame is made of a composite material (i.e. when floor 15 and thus also the bottom panel 24 of floor 15 are made of a composite material), the bottom panel 24 of floor 15 may comprise a series of metal inserts (typically made of aluminum and glued to the remaining part of the bottom panel 24), each of which is arranged in contact with the lower surface of the support matrix 22 and has a thermal conductivity higher than the remaining part of the bottom panel 24. The function of the metal inserts is to increase the dermal conductivity at the support matrix 22 so as to allow a better cooling of the storage system 14.

According to the preferred embodiment shown in FIGS. 4, 5 and 8, each chemical battery 18 comprises an electrochemical cell 19 having a cylindrical shape, and an outer shell 25, which presents a cylindrical shape, houses in its inside the electrochemical cell 19 keeping the electrochemical cell 19 itself compressed, and is made of a material with a high mechanical strength (typically metal material such as steel or reinforced aluminum, but the use of composite materials such as carbon fiber is also contemplated).

According to the preferred embodiment shown in FIGS. 4, 5 and 8, each chemical battery 18 is provided with safety valve 26 (i.e. a venting or overpressure valve) which is arranged at a base of the outer shell 25 and is adjusted to open up when the pressure into the outer shell 25 exceeds a predetermined safety pressure; in other words, the safety valve 26 is a mechanical maximum pressure valve which opens up when the pressure into the outer shell 25 is too high to prevent a violent explosion of the outer shell 25 itself. A lithium-ion electrochemical cell 19 is subject to a destructive phenomenon called "thermal drift" which is started by a short-circuit caused by the decomposition of the single components of the electrochemical cell 19 (typically subsequent to manufacturing defects) and is characterized by highly exothermic reactions which cause a sudden and high increase in temperatures and pressure (in case of "thermal drift", the temperature into the outer shell 25 may quickly reach several hundreds degrees). Thus, in case of "thermal drift" of a chemical battery 18, rather than having a violent explosion it is preferred to relieve the pressure/temperature through the safety valve 26 which autonomously opens up; once the safety valve 26 has autonomously opened up due to the pressure thrust into the outer shell 25, the so-called "venting" escapes from the safety valve 26, consisting of flames, high temperature gases, and fused lithium.

According to the preferred embodiment shown in FIGS. 4, 5 and 8, each chemical battery 18 is provided with an outlet duct 27, which connects the safety valve 26 to an evacuation opening 28 which is preferably obtained through the bottom panel 24 of floor 15; the function of the outlet duct 27 is to collect and channel the "venting" to bring the "venting" away from the other chemical batteries 18 which are this preserved (in fact, it is imperative to prevent a chain reaction in which the "thermal drift" of a chemical battery 18 extends to the other adjacent chemical batteries 18 that are impinged by the "venting"). In fact, the "venting" produced by a chemical battery 18 that has gone into "thermal drift" is collected and conveyed by the outlet duct 27 to be vented outside vehicle 1 (and directly on The road surface) through the evacuation opening 28 obtained in the bottom panel 24 of floor 15; in this way, the "venting" produced by a chemical battery 18 that has gone in "thermal drift" does not affect the adjacent chemical batteries 18 in any way. Preferably, each evacuation opening 28 is closed by an adjusted plug 29, which is set to come off in the presence of a pressure that is higher than a predetermined threshold; the function of the adjusted plug 29 is to prevent water and dirt from entering through the evacuation opening 28 during the use of vehicle 1.

According to a preferred embodiment, the plastic material that makes up the support matrix 22 has a relatively low melting temperature in the order of about 150-200° C.) so that if a chemical battery 18 goes in "thermal drift", the heat produced by the "thermal drift" causes (or may cause) a local melting of the support matrix 22; such local melting of the support matrix 22 reduces the heat transmission to the other chemical batteries 18 adjacent to the chemical battery 18 gone in "thermal drift", since it uses a part of the heat generated by the "thermal drift" as latent melting heat. Preferably, the plastic material that makes up the support matrix 22 has a relatively low melting temperature combined with a high latent melting heat.

FIGS. 3, 6 and 7 schematically show the electric connections of the chemical batteries 18; in particular, the chemical batteries 18 of a same row 21 are connected to each other in parallel, while the various rows 21 of chemical batteries 18 are typically connected to each other in series. As shown in FIGS. 3, 6 and 7, each row 21 of chemical batteries 18 has a positive electric manifold 30 electrically connected to all the positive poles of the chemical batteries 18 of row 21 through corresponding conductors 31, and has a negative electric manifold 32 electrically connected to all the negative poles of the chemical batteries 18 of row 21 through corresponding conductors 33. In the embodiments of FIGS. 3 and 6, each electric manifold 30 or 32 is associated with a single row 21 of chemical batteries 18, while in the embodiment of FIG. 7, each electric manifold 30 or 32 is associated with two adjacent rows 21 of chemical batteries 18 (obviously, the chemical batteries 18 in the two adjacent rows 21 are oriented in an opposite manner to arrange the corresponding positive poles or the corresponding negative poles facing each other).

Preferably, the electric connections of the chemical batteries 18 are sized so that in case of crash causing a deformation of the storage system 14 and thus, as described above, a displacement of a part of the chemical batteries 18 from their natural housing (due to a mechanical collapse of the support matrix 22), the electric continuity between the displaced chemical batteries 18 and manifolds 30 and 32 is interrupted (i.e. conductors 31 and 33 are thorn). In this way, the chemical batteries 18 which are displaced automatically disconnect from the electric circuit, thus reducing the risk of short-circuits or electrocution; in other words, after the crash there are several chemical batteries 18 not connected to each other, thus individually having a moderate electric voltage (at most few tenth Volts that are not hazardous to human beings). By way of example, conductors 31 and 33 may be implemented so as to have a limited (adjusted) mechanical strength to break up in case of crash which causes a deformation of the storage system 14 and thus a displacement of a part of the chemical batteries 18 from their natural housing.

The above-described system 14 for the storage of electric energy has several advantages.

Firstly, the above-described system 14 for the storage of electric energy is easy and cost-effective to be implemented even when it is manufactured in a limited number of pieces (for example in the order of few thousands pieces a year), since the above-described chemical batteries 18 are available on the market in large amounts and at moderate prices as they are used in most portable computers. In other words, the above-described chemical batteries 18 need not be specifically implemented for the storage system 14, as they are already available on the market; accordingly, the storage system 14 is simple and cost-effective to be implemented as it uses commercial components for its "core" (i.e. for the chemical batteries 18).

The above-described system 14 for the storage of electric energy has a moderate overall thickness (particularly when the chemical batteries 18 are horizontally arranged); in this way, the storage system 14 may be arranged at floor 15 even in a high performance sports road vehicle 1. By way of example, the above-described system 14 for the storage of electric energy may have an overall thickness of about 15-25 mm.

The above-described system 14 for the storage of electric energy has a moderate overall weight, since container 17 and the support matrix 22 are made of a plastic material having a relatively moderate overall strength (so as to collapse in case of crash).

The above-described system 14 for the storage of electric energy has a high intrinsic safety, since it has a large number of chemical batteries 18 (even several hundreds) small size (if compared to a conventional chemical battery for motor traction), each of which is provided with an autonomous mechanical protection (the outer shell 25 made of steel or the like) having a high strength. Thus, in case of crash causing a deformation of the storage system 14, container 17 and the support matrix 22 housing the chemical batteries 18 collapse (break up), but the single chemical batteries 18 remain substantially entire since they are displaced due to the collapse of container 17 and of the support matrix 22 without being subjected to deformations. In other words, the storage system 14 is an easily deformable structure (i.e. which gets deformed under mechanical stress without offering a significant resistance) in which the chemical batteries 18 are inserted, each of which is provided with an autonomous mechanical protection (the outer shell 25 made of steel or the like) having a high strength; in case of crash causing a deformation of the storage system 14, the chemical batteries 18 are displaced due to the collapse of the support matrix 22 but are not deformed (i.e. they are not subjected to very high mechanical stresses). On the contrary, a traditional storage system has a low number (few units) of large sized chemical batteries which are mechanically protected by means of an outer metal enclosure having a high mechanical strength which encloses all the chemical batteries; in a traditional storage system of this type, in case of crash causing a deformation of the storage system, the chemical batteries get deformed and are thus destroyed.

As mentioned above, the above-described system 14 for the storage of electric energy has a large number of chemical batteries 18 (even several hundreds) of small size (if compared to a conventional chemical battery for motor traction), each of which is provided with an autonomous mechanical protection (the outer shell 25 made of steel) having a high strength. In this way, each chemical battery 18 has a relatively moderate stored energy (if compared to a conventional chemical battery for motor traction) and therefore, it is much easier to manage and restrain the possible "thermal drift" of a single chemical battery 18.

Thanks to the high intrinsic safety of the above-described storage system 14, in the above-described system 14 for the storage at electric energy the chemical batteries 18 can use lithium-ion ("Li-Ion") electrochemical cells 19 which have one of the best power-weight ratios, no memory effect, and a slow loss of the charge when not in use.

The invention claimed is:

1. A vehicle (1) with electric propulsion, which presents a longitudinal direction (L), which is parallel to the direction of the rectilinear motion, and a transverse direction (T), which is perpendicular to the longitudinal direction (L), comprises:
- a motor propulsion system (4) provided with at least one electric machine (8); and
- a system (14) for the storage of electric energy comprising a pack of chemical batteries (18), which are connected to each other in series and in parallel and comprise respective electrochemical cells (19);
- a support panel (24), on which the pack of chemical batteries (18) lies and through which through holes are obtained; and
- a support matrix (22) made of a plastic material inside which the chemical batteries (18) are embedded; and
- wherein each chemical battery (18) has a cylindrical shape having a central symmetry axis (20);
- wherein the chemical batteries (18) are horizontally arranged inside the vehicle (1) and the central symmetry axis (20) of each chemical battery (18) forms an acute angle with both the longitudinal direction (L) of the vehicle (1) and with the transverse direction (T) of the vehicle (1)
- wherein each chemical battery (18) is provided with a safety valve (26), which is arranged at a base, and each chemical battery (18) is provided with an outlet duct (27), which is arranged outside each chemical battery (18) downstream from the safety valve (26) and connects the safety valve (26) to at least one of the respective through holes of the support panel (24) defining an evacuation opening (28).

2. A vehicle (1) according to claim 1, wherein all the chemical batteries (18) are parallel to each other and, therefore, present the same orientation with respect to the longitudinal direction (L) and to the transverse direction (T) of the vehicle (1).

3. A vehicle (1) according to claim 1, wherein the chemical batteries (18) present at least two different orientations with respect to the longitudinal direction (L) and to the transverse direction (T) of the vehicle (1).

4. A vehicle (1) according to claim 3, wherein the chemical batteries (18) are arranged in rows (21) that are parallel to each other and the chemical batteries (18) of each row (21) are arranged perpendicular to the chemical batteries (18) of the adjacent rows (21).

5. A vehicle (1) according to claim 1, wherein the support matrix (22) has an adjusted mechanical strength which is lower than the mechanical strength of the single chemical batteries (18) so that in case of crash, the support matrix (22) collapses through deformation while the single chemical batteries (18) remain intact and are displaced with respect to the support matrix (22).

6. A vehicle (1) according to claim 1, and comprising a container (17), which houses the pack of chemical batteries (18) embedded in the support matrix (22) and presents an adjusted mechanical strength, which is lower than the mechanical strength of the single chemical batteries (18) so that in case of crash, the container (17) collapses through deformation while the single chemical batteries (18) remain intact and are displaced with respect to the container (17).

7. A vehicle (1) according to claim 6, wherein the support matrix (22) present an adjusted mechanical strength, which is lower than the mechanical strength of the single chemical batteries (18) so that in case of crash, both the container (17) and the support matrix (22) collapse through deformation while the single chemical batteries (18) remain intact and are displaced with respect to both the container (17) and to the support matrix (22).

8. A vehicle (1) according to claim 1, wherein the support matrix (22) is made of a plastic material, which is thermally conductive and electrically insulating.

9. A vehicle (1) according to claim 1, and comprising a cooling plate (23), which lies on a surface of the support matrix (22) and can be thermally connected to a cooling system, so as to evacuate the heat produced by the chemical batteries (18).

10. A vehicle (1) according to claim 1, wherein the evacuation opening (28) is closed by an adjusted plug (29), which is set to come off in the presence of a pressure that is higher than a predetermined threshold.

11. A vehicle (1) according to claim 1, wherein the support panel (24) makes up part of a floor of the vehicle (1).

* * * * *